(12) United States Patent
Tanaka et al.

(10) Patent No.: US 7,714,703 B2
(45) Date of Patent: May 11, 2010

(54) RADIO COMMUNICATION MODULE AND METHOD FOR INSTALLING RADIO COMMUNICATION MODULE ON LICENSE PLATE

(75) Inventors: Yukiomi Tanaka, Takahama (JP); Shingo Yoshida, Ichinomiya (JP)

(73) Assignee: Denso Corporation, Kariya (JP)

( * ) Notice: Subject to any disclaimer, the term of this patent is extended or adjusted under 35 U.S.C. 154(b) by 290 days.

(21) Appl. No.: 11/826,848

(22) Filed: Jul. 19, 2007

(65) Prior Publication Data
US 2008/0048845 A1    Feb. 28, 2008

(30) Foreign Application Priority Data
Aug. 23, 2006    (JP) .............................. 2006-226504

(51) Int. Cl.
*B60Q 1/00*    (2006.01)
(52) U.S. Cl. ............................... 340/425.5; 340/426.1
(58) Field of Classification Search .............. 340/425.5, 340/572.1, 572.8, 426.1; 40/201, 202
See application file for complete search history.

(56) References Cited

U.S. PATENT DOCUMENTS

| | | | |
|---|---|---|---|
| 2,868,256 A | 1/1959 | Poupitch | |
| 4,055,208 A | 10/1977 | Blaul | |
| 4,172,611 A * | 10/1979 | Krus | 296/97.22 |
| 4,918,792 A * | 4/1990 | Engels | 40/202 |
| 6,286,238 B1 * | 9/2001 | Harrington | 40/202 |
| 7,394,374 B2 * | 7/2008 | Tanaka et al. | 340/572.1 |
| 7,525,433 B2 * | 4/2009 | Tanaka et al. | 340/572.1 |
| 7,535,342 B2 * | 5/2009 | Tanaka et al. | 340/425.5 |
| 2006/0049945 A1 | 3/2006 | Tanaka et al. | |
| 2006/0061456 A1 | 3/2006 | Tanaka et al. | |
| 2006/0124736 A1 | 6/2006 | Tanaka et al. | |

FOREIGN PATENT DOCUMENTS

| | | |
|---|---|---|
| JP | A-11-281933 | 10/1999 |
| JP | A-2000-289539 | 10/2000 |

OTHER PUBLICATIONS

Office Action dated Dec. 10, 2008 in corresponding Chinese patent application No. 200710141712.5 (and English translation).
Search Report dated Nov. 22, 2007 in corresponding Great Britain Patent Application No. 0715083.2.
Office Action dated Jul. 31, 2009 in corresponding Chinese patent application No. 200710141712.5 (and English translation).

* cited by examiner

*Primary Examiner*—John A Tweel, Jr.
(74) *Attorney, Agent, or Firm*—Posz Law Group, PLC

(57) ABSTRACT

When a radio communication module for electronic license plates is installed on a license plate, the following procedure is taken: an attaching portion and an enclosure integrated with it are fixed on a license plate with a bolt. Further, a protruded portion fixed on the attaching portion is engaged into the license plate, and the rotation of the radio communication module for electronic license plates on the bolt is thereby suppressed.

13 Claims, 9 Drawing Sheets

US 7,714,703 B2

RADIO COMMUNICATION MODULE AND METHOD FOR INSTALLING RADIO COMMUNICATION MODULE ON LICENSE PLATE

CROSS REFERENCE TO RELATED APPLICATION

This application is based on and incorporates herein by reference Japanese Patent Application No. 2006-226504 filed on Aug. 23, 2006.

FIELD OF THE INVENTION

The present invention relates to a radio communication module designed so as to be installed on a license plate and a method for installing this radio communication module on a license plate.

BACKGROUND OF THE INVENTION

In recent years, it has been proposed to install a radio communication module on the license plate of a vehicle. For example, electronic license plates are so designed as to be installed on a license plate and transmit vehicle information such as the information of the license plate by radio. (Refer to Patent Document 1, for example.) As a method for installing a radio communication module on a license plate, there are known methods of utilizing a bolt for installing a license plate on a vehicle body and fixing the module together with the license plate by tightening the bolt.

When a radio communication module is fixed by only such a bolt, it is preferable to separately provide a mechanism for suppressing the rotational displacement of the radio communication module relative to a license plate. One of methods for suppressing rotational displacement is such that a radio communication module is hooked on an end of a license plate and the module is thereby fixed. (Refer to Patent Document 2.)

Patent Document 1: JP-2000-289539 A
Patent Document 2: JP-2006-076345 A (US2006/0061456)

However, these techniques involve a problem. It is difficult to install a module on a license plate with any other part present in proximity to an end of the plate or a largely deformed license plate. (Examples of the former license plate include license plates having a decorative frame and backlit license plates having a luminescent device at the back.)

SUMMARY OF THE INVENTION

The invention has been made with the foregoing taken into account, and an object of the invention is to provide a technology for radio communication modules with which a radio communication module can be installed on a license plate.

To attain the above object, according to an example of the present invention, a radio communication module is provided as follows. An enclosure is included to protect a circuit for radio communication and have a hole for inserting a bolt for fixing the license plate on a vehicle body of the vehicle. A protruded portion is included to be fixed on the enclosure such that the protruded portion is pressed by the enclosure and thereby engaged into the license plate when the radio communication module is installed on the license plate.

According to another example of the present invention, a radio communication module to be installed on the license plate of a vehicle is provided as follows. An enclosure body is included for protecting a circuit for radio communication. A hole forming portion having a hole is included for inserting a bolt formed therein. A protruded portion is included. When the enclosure body is installed on a license plate, the hole forming portion is fixed on the enclosure body and is further fixed on the license plate by the bolt passing through the hole. When the hole forming portion is fixed on the license plate by the bolt passing through the hole, the protruded portion is fixed on the enclosure body or the hole forming portion and is engaged into the license plate.

According to yet another example of the present invention, a method is provided as follows. The method is for installing a radio communication module including an enclosure for protecting a circuit for radio communication and having a hole for inserting a bolt, and a protruded portion on the license plate of a vehicle. The method comprises: pressing the protruded portion against the license plate with the protruded portion fixed on the enclosure; and inserting the bolt into the hole and the license plate.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
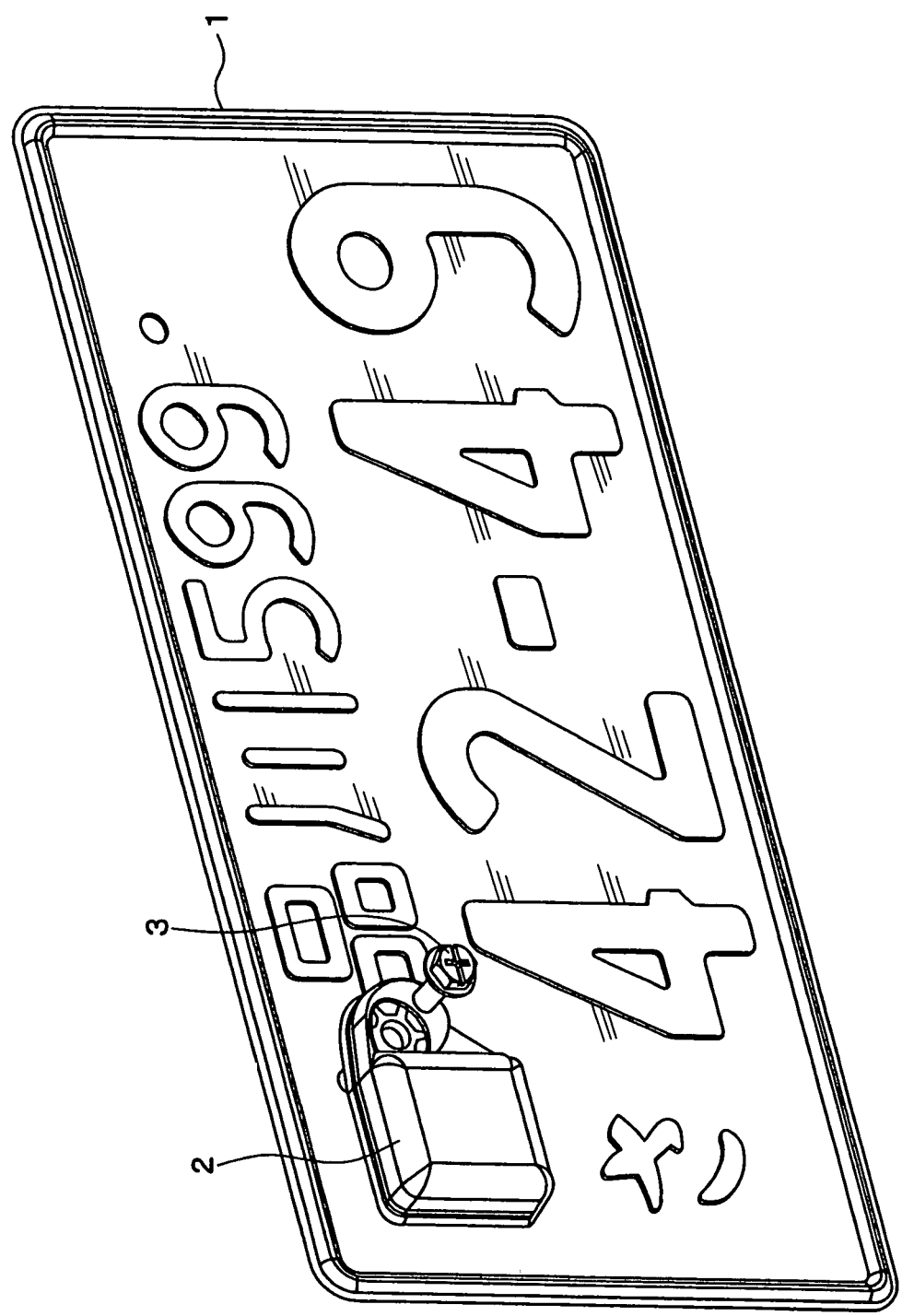
FIG. 1 is a perspective view illustrating a way a radio communication module for an electronic license plate is fixed on a license plate with a bolt according to a first embodiment.

Hereafter, description will be given to a first embodiment of the invention. FIG. 1 illustrates the way a radio communication module 2 for electronic license plates in this embodiment is fixed on a vehicle license plate 1 with a bolt 3 in the form of perspective view.

The bolt 3 is used to install and fix the license plate 1 on a vehicle body. When the radio communication module 2 for electronic license plates is not installed on the license plate 1, the license plate 1 is fixed on the vehicle body by taking the following procedure: the bolt 3 is inserted into a hole in the license plate 1, and the bolt 3 is further inserted into a threaded screw hole in the vehicle body and tightened.

In this embodiment, the following are accomplished by fastening together the license plate 1 and the radio communication module 2 for electronic license plates with one bolt 3: fixing the radio communication module 2 for electronic license plates on the license plate 1 and fixing the license plate 1 on the vehicle body. Specifically, the following procedure is taken: the bolt 3 is inserted into the hole in the radio communication module 2 for electronic license plates; the bolt 3 is further inserted into the hole in the license plate 1; and the bolt 3 is further inserted and tightened in the threaded screw hole in the vehicle body. Thus, the radio communication module 2 for electronic license plates is held down onto a surface of the license plate 1 and fixed on the license plate 1.

Figure 2:
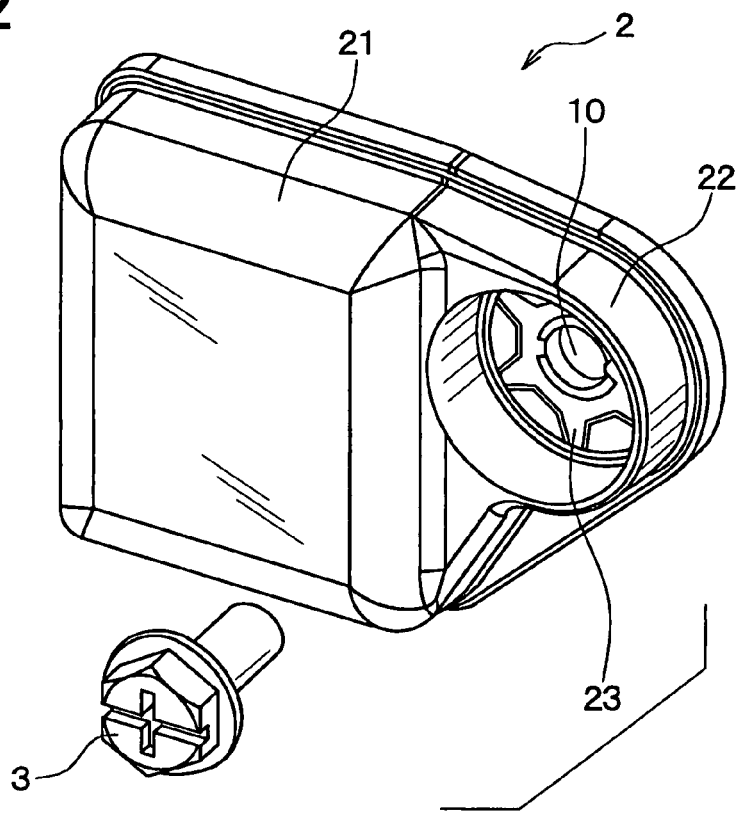
FIG. 2 is a perspective view illustrating a radio communication module for electronic license plates and a bolt as viewed from the front of the radio communication module.
Figure 3:
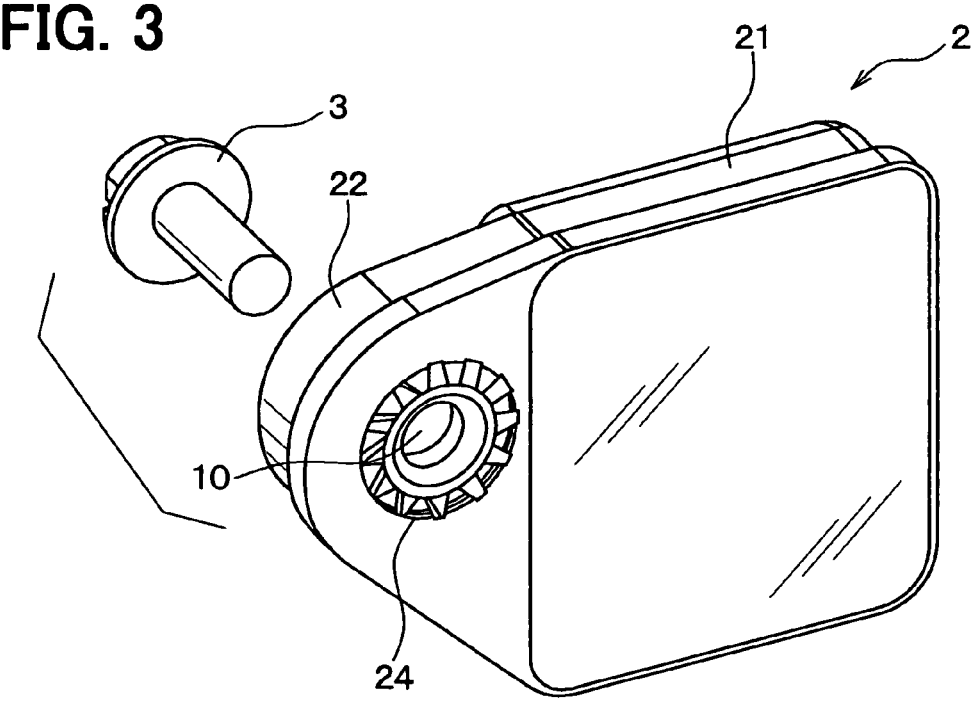
FIG. 3 is a perspective view illustrating a radio communication module and a bolt as viewed from the contact face of the radio communication module.

FIG. 2 and FIG. 3 are perspective views of the radio communication module 2 for electronic license plates and the bolt 3. FIG. 2 is a perspective view of the radio communication module 2 for electronic license plates viewed from the front, that is, from the side viewable after installation. FIG. 3 is a perspective view of the radio communication module 2 for electronic license plates viewed from the contact face side, that is, from the side opposed to the license plate 1 after installation.

As illustrated in these drawings, the radio communication module 2 for electronic license plates includes an enclosure constructed of an enclosure body 21 and an attaching portion 22. Further, the radio communication module 2 for electronic license plates includes a whirl-stop plate 23 and a protruded member 24. The enclosure body 21 is made of resin and accommodates the components of the radio communication module 2 for electronic license plates for transmitting vehicle information such as the information of the license plate 1 by radio. The components include a battery, a communication circuit, a control circuit, a memory, and the like. These components are protected from the exterior by the enclosure body 21.

The attaching portion 22 is formed integrally with the enclosure body 21 and is thereby fixed on the enclosure body 21. In the attaching portion 22, there is formed a hole 10 that penetrates the radio communication module 2 for electronic license plates from its front face to its contact face. When the radio communication module 2 for electronic license plates is fixed on the license plate 1, the bolt 3 is inserted into this hole 10.

The whirl-stop plate 23 is a flat metal plate in a noncircular shape, more specifically, in the shape of a star obtained by further protruding outward the vertexes of a regular hexagon. The whirl-stop plate 23 is provided in its center with a hole having the same size as the hole 10 in the attaching portion 22. When the radio communication module 2 for electronic license plates is fixed on the license plate 1, the following procedure is taken as illustrated in FIG. 2: the whirl-stop plate 23 is attached to the front face of the attaching portion 22 so that its hole is aligned with the hole 10; and the bolt 3 is inserted into the hole in the whirl-stop plate 23 and then into the hole 10.

The protruded member 24 is formed of a metal harder than the material (e.g., aluminum) of the license plate 1 and includes multiple sharp-pointed protrusions. In the protruded member 24, there is formed a hole slightly smaller than the hole 10 in the attaching portion 22, and the above-mentioned metal protrusions are annularly arranged around this hole. As illustrated in FIG. 3, this protruded member 24 is attached to the contact face side of the attaching portion 22, and thus, the points of these protrusions face toward the license plate 1.

Figure 4:
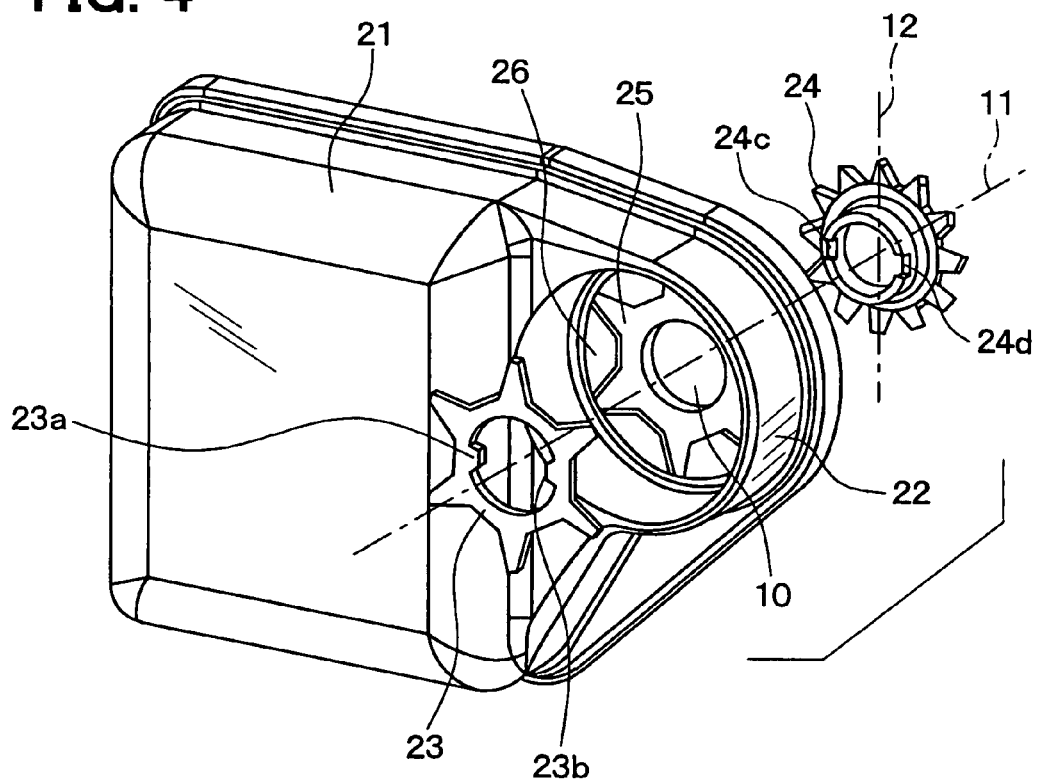
FIG. 4 is a perspective view illustrating a procedure for installing a whirl-stop plate and a protruded member to an attaching portion.
Figure 5:
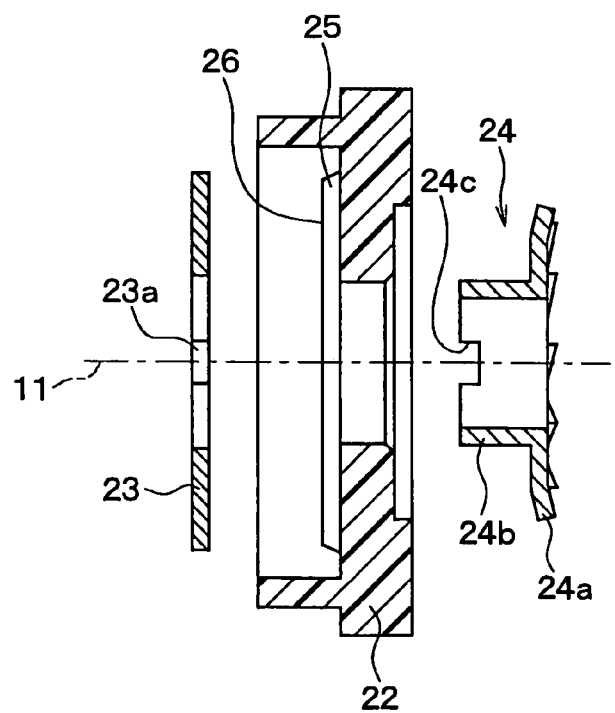
FIG. 5 is a sectional view taken along a plane containing lines 11, 12 of FIG. 4.
Figure 6:
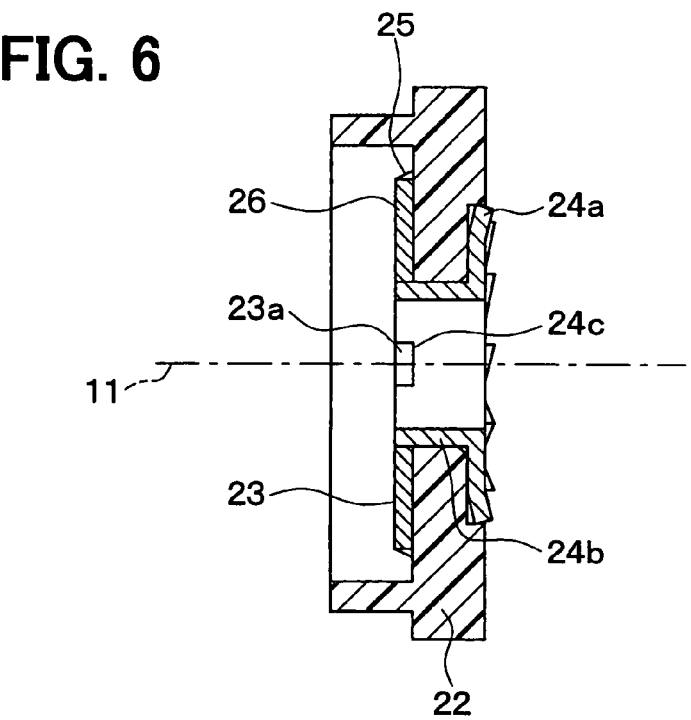
FIG. 6 is a sectional view illustrating a whirl-stop plate and a protruded member assembled to an attaching portion, taken along the same plane as in FIG. 5.

FIGS. 4 to 6 illustrate a procedure for attaching the whirl-stop plate 23 and the protruded member 24 to the attaching portion 22. FIG. 5 is a sectional view obtained by cutting the attaching portion 22, whirl-stop plate 23, and protruded member 24 when the attaching portion 22, whirl-stop plate 23, and protruded member 24 are disposed as shown in the perspective view of FIG. 4. This sectional view is taken along the plane containing the center line 11 perpendicularly penetrating the center of the hole 10 and the line 12 passing through the uppermost end and the lowermost end of the protruded member 24.

First, the attaching portion 22, whirl-stop plate 23, and protruded member 24 are disposed as illustrated in FIG. 4 and FIG. 5. As illustrated in FIGS. 4 and 5, the whirl-stop plate 23 has swaging portions 23a, 23b protruded toward the center of its hole, on the immediate left and right of the hole.

As illustrated in FIG. 5, the protruded member 24 includes: a protruded portion 24a constructed of multiple annularly arranged protrusions and a member supporting these protrusions; and a cylindrical bushing portion 24b formed integrally with the protruded portion 24a. More specifically, the protruded member 24 is in such a shape that a bushing part is combined with an externally toothed washer. The length of the bushing portion 24b slightly exceeds the depth of the hole 10. The bushing portion 24b has cuts 24c, 24d on the left and right of its front end.

The peripheral portion of the hole 10 on the front side of the attaching portion 22 is raised frontward and forms a slightly tapered cylindrical column 26. On the top face (i.e., the face opposite the whirl-stop plate 23) of the cylindrical column 26, there is formed a depression 25 depressed from the top face of the cylindrical column 26 toward the license plate 1. The shape of the depression 25 viewed from the front is substantially analogous to that of the whirl-stop plate 23, and its size is substantially equal to that of the whirl-stop plate 23. Therefore, the whirl-stop plate 23 is fit tight into the depression 25.

FIG. 6 is a sectional view illustrating the way the whirl-stop plate 23 and the protruded member 24 are assembled to the attaching portion 22, taken along the same plane as in FIG. 5. As illustrated in this drawing, the whirl-stop plate 23 is fit into the depression 25, and then the bushing portion 24b of the protruded member 24 is inserted into the hole 10. The swaging portions 23a and 23b of the whirl-stop plate 23 are respectively fit into the cuts 24c and 24d situated at an end of the bushing portion 24b and joined with each other by swaging. Thus, the whirl-stop plate 23 and the protruded portion 24a are fixed together through the bushing portion 24b with the attaching portion 22 in-between. The swaged joints between the swaging portions 23a, 23b and the cuts 24c, 24d prevent the whirl-stop plate 23 and the protruded member 24 from being rotated relative to each other.

Further, the whirl-stop plate 23 is brought into contact with the depression 25 by this assembling, and this restricts the rotation of the whirl-stop plate 23 relative to the attaching portion 22. As a result, the rotation of the protruded member 24 relative to the attaching portion 22 is restricted. That is, the protruded member 24 and the attaching portion 22 are so structured that they do not turn free relative to each other.

Figure 7:
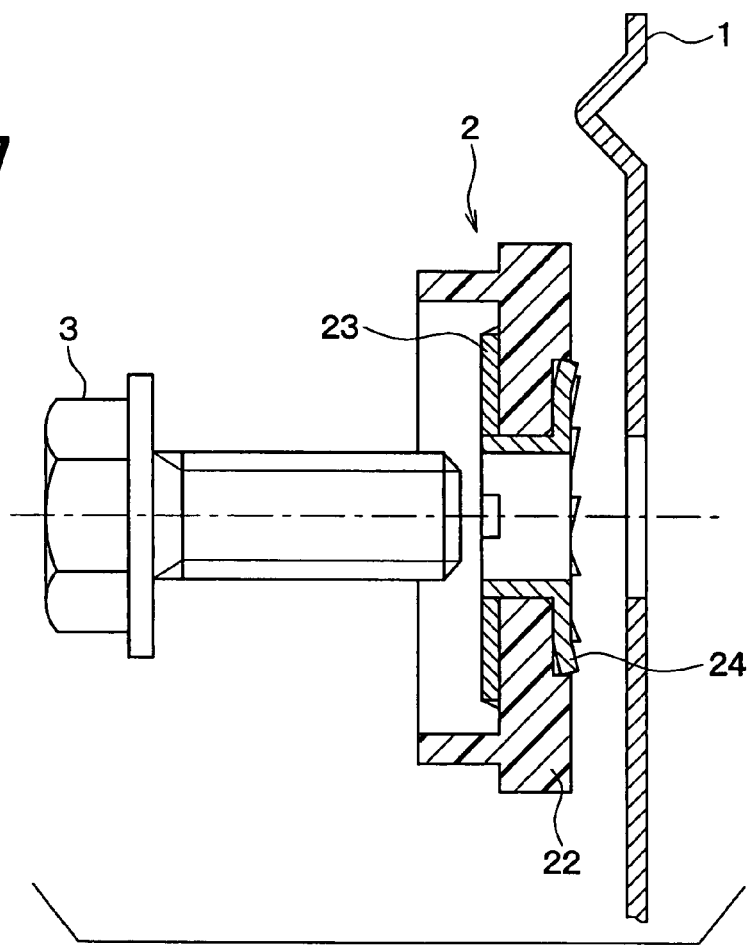
FIG. 7 is a sectional view illustrating a procedure for fixing a radio communication module on a license plate, taken along the same plane as in FIG. 5.
Figure 8:
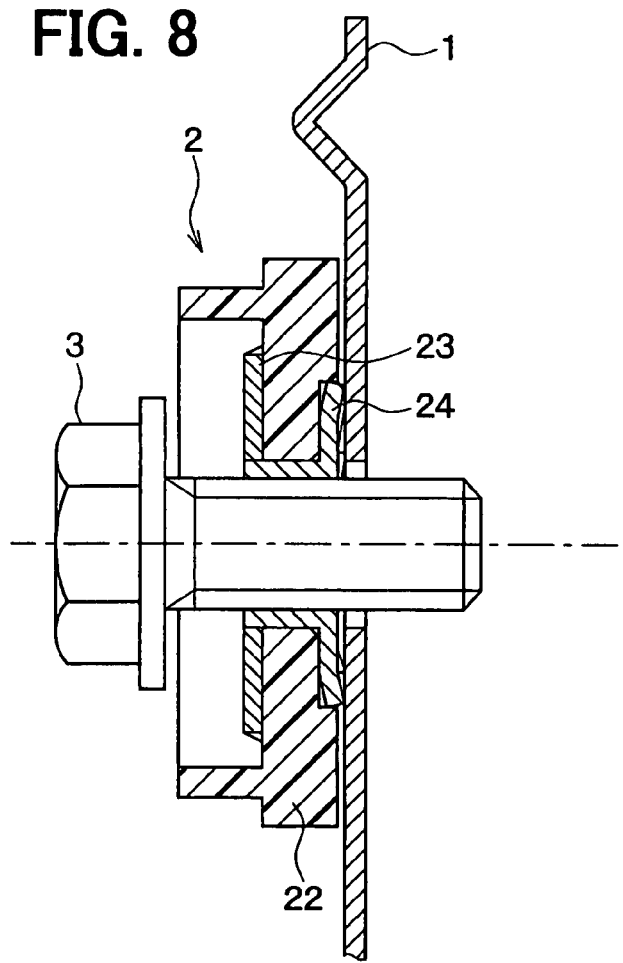
FIG. 8 is a sectional view illustrating a procedure for fixing a radio communication module on a license plate, taken along the same plane as in FIG. 5.
Figure 9:
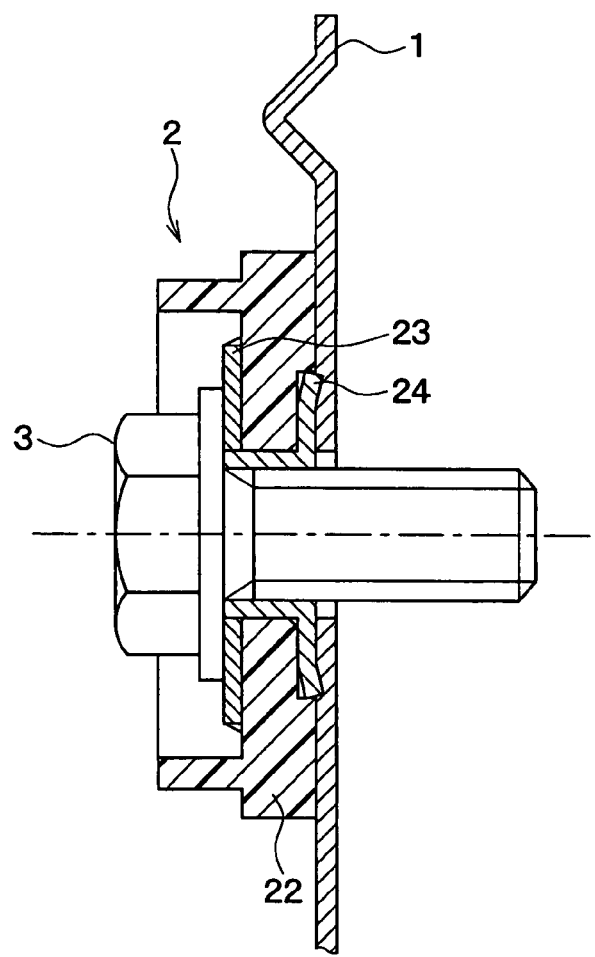
FIG. 9 is a sectional view illustrating a procedure for fixing a radio communication module on a license plate, taken along the same plane as in FIG. 5.

FIG. 7 to FIG. 9 illustrate a procedure for fixing the thus assembled radio communication module 2 for electronic license plates on the license plate 1 in the form of sectional view taken along the same plane as in FIG. 5.

As illustrated in these drawings, the hole 10 in the radio communication module 2 for electronic license plates is aligned with the hole in the license plate 1, and the bolt 3 is inserted into these holes from the front side of the radio communication module 2 for electronic license plates. The portion of the bolt 3 protruded on the back side of the license plate 1 is screwed into a threaded screw hole, not shown, in the vehicle body. The radio communication module 2 for electronic license plates is held down onto the license plate 1 by firmly tightening the bolt 3, and the threaded screw hole, license plate 1, and radio communication module 2 for electronic license plates are fixed together. At this time, the protrusions of the protruded portion 24a are pressed by the enclosure, and the protrusions are thereby engaged into the license plate 1. The engagement between the protrusions and the license plate 1 restricts the rotation of the protruded member 24 on the bolt 3 relative to the license plate 1. In turn, this restricts the rotation of the radio communication module 2 for electronic license plates on the bolt 3 relative to the license plate 1.

As mentioned above, when the radio communication module 2 for electronic license plates is installed on the license plate 1, the attaching portion 22 and the enclosure body 21 are fixed on the license plate 1 by the bolt 3. In addition, the protruded portion 24a fixed on the enclosure body 21 or the attaching portion 22 is engaged into the license plate 1. As the result of the protruded portion 24a being engaged into the license plate 1, it is possible to implement the following: the radio communication module 2 for electronic license plates can be installed on the license plate 1 while the rotation of the radio communication module 2 for electronic license plates relative to the license plate 1 is suppressed. At the time of installation, it is unnecessary to utilize an end of the license plate 1. Even when the license plate 1 is bent, the rotation of the radio communication module 2 for electronic license plates on the bolt 3 can be suppressed as long as the protruded portion 24a is pressed against the license plate 1.

Therefore, with respect to installation of the radio communication module 2 for electronic license plates, the following can be implemented just by fastening together the license plate 1 and the radio communication module with one bolt 3: the module can be fixed in various directions (the direction parallel with the surface of the license plate 1, the direction perpendicular to the surface of the license plate, and the direction of rotation). Further, since the work of installation of the radio communication module 2 for electronic license plates is simplified, it can be easily installed. The module is installed on the license plate 1 just by its protrusions being engaged into the surface of the license plate. Therefore, the license plate 1 can be easily removed just by removing the bolt used to fasten together the module and the license plate 1. This makes it easier to replace the internal battery of the radio communication module 2 for electronic license plates.

The radio communication module 2 for electronic license plates in this embodiment does not utilize a shape specific to an end of the license plate 1 or the like. Therefore, the radio communication module 2 for electronic license plates can be installed as long as the license plate 1 has a hole for the bolt 3 and a flat portion into which the protruded portion 24a can be engaged. Therefore, the radio communication module 2 for electronic license plates in this embodiment can be installed on a rather deformed license plate as well as a license plate provided with a decorative license plate frame and a backlit license plate. After the radio communication module 2 for electronic license plates is installed on a license plate 1, only the enclosure body. 21 and the attaching portion 22 on the license plate 1 are externally viewable and this provides a simple appearance.

The protruded portion 24a is disposed and fixed on a circumference with the hole 10 in the attaching portion 22 positioned in the center. With this construction, the rotation of the license plate 1 on the bolt 3 can be efficiently suppressed.

The radio communication module 2 for electronic license plates further includes the noncircular whirl-stop plate 23 and the bushing portion 24b to be inserted into the hole 10. The attaching portion 22 has the depression 25 around the hole 10 on the opposite side to the side facing toward the license plate 1. The rotation of the protruded portion 24a and the whirl-stop plate 23 relative to each other with the hole 10 in-between is restricted, and they are fixed through the bushing portion 24b. At the same time, the whirl-stop plate 23 is fit in the depression 25 with its rotation restricted. The protruded portion 24a is thereby fixed to the attaching portion 22.

With this construction, the rotational displacement of the whirl-stop plate 23 is restricted by the depression 25, and the rotation of the attaching portion 22 and the protruded portion 24a on the bolt 3 relative to each other can be thereby suppressed.

When a screw or a bolt made of resin is tightened, there is the possibility of the tightened screw or bolt being loosened due to creep deformation or thermal deformation of the resin. Since the bushing portion 24b is buried in the hole 10, the tightening force of the bolt 3 is received by the bushing portion 24b. For this reason, even if creep deformation or thermal deformation occurs in the resin, reduction in the fastening force of the bolt 3 is prevented.

The protruded portion 24a is formed integrally with the bushing portion 24b. At the above-mentioned time, therefore, the whirl-stop plate 23 and the protruded portion 24a are fixed together through the bushing portion 24b . That is, the tightening axial force of the bolt 3 is received by the bushing portion 24b integrated with the protruded portion 24a, and the tightening force is directly transmitted to the protruded portion 24a. With this construction, the protruded portion 24a can be effectively pressed against and engaged into the license plate 1 by tightening the bolt 3.

Further, as indicated above or shown in FIGS. 1, 2, 3, a gravity center of the enclosure (i.e., enclosure body 21 and attaching portion 22) or radio communication module 2 is not located around the hole 10 or the rotational axis of the bolt 3 when the enclosure is installed on a license plate using the bolt. This may thereby cause a force to rotate the enclosure 21, 22 or module 2 to rotate around the bolt 3. That is, the above-mentioned configuration for installation of the radio communication module 2 may be more effective in such a case, i.e., that a gravity center of a radio communication module for electronic license plates is deviated from a rotation axis of the bolt to thereby cause a force for rotating the module when the module is installed on a license plate using the bolt.

Second Embodiment

Figure 10:
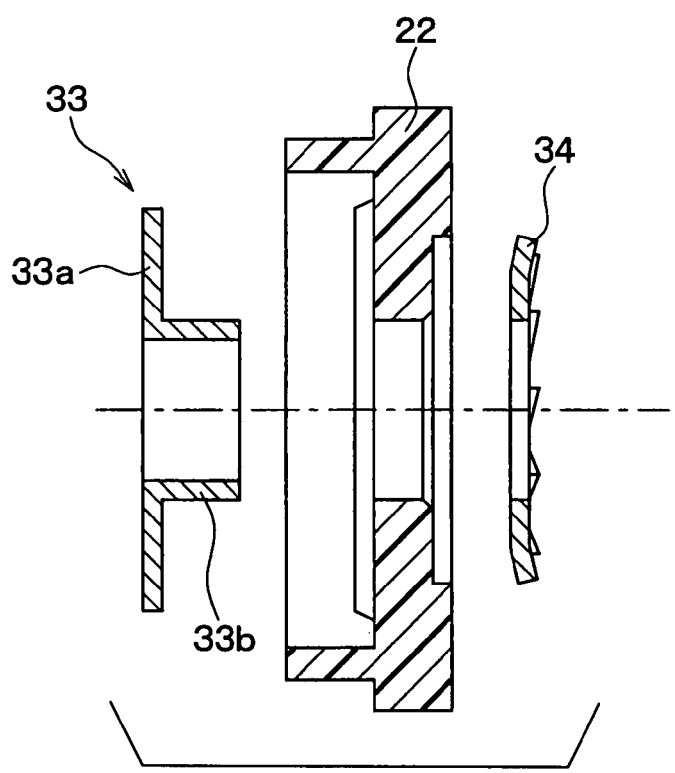
FIG. 10 is a sectional view of a radio communication module in a second embodiment, depicted in the same style as of FIG. 5.
Figure 11:
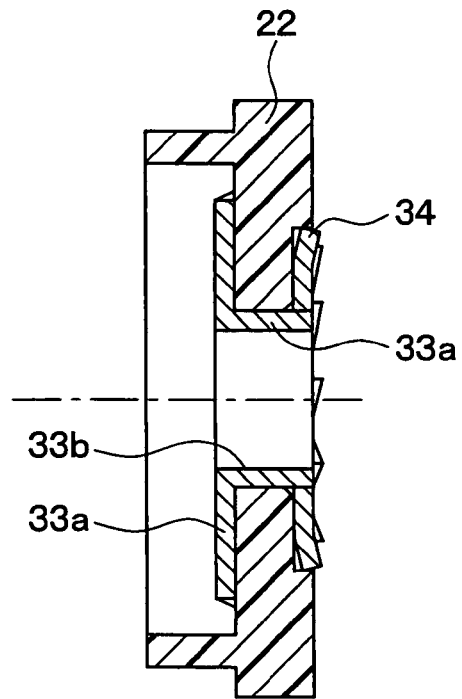
FIG. 11 is a sectional view of a radio communication module in the second embodiment, depicted in the same style as of FIG. 6.

Description will be given to a second embodiment of the invention with a focus on a difference from the first embodiment. FIG. 10 and FIG. 11 respectively illustrate a radio communication module 2 for electronic license plates in the second embodiment in the form of sectional view in the same style as of FIG. 5 and FIG. 6. The radio communication module 2 for electronic license plates in this embodiment is different from the radio communication module 2 for electronic license plates in first embodiment in that: the radio communication module 2 for electronic license plates in this embodiment has a whirl-stop member 33 and an externally toothed washer 34 in place of the whirl-stop plate 23 and the protruded member 24.

The whirl-stop member 33 includes a plate portion 33a of the same material and shape as those of the whirl-stop plate 23 in the first embodiment and a bushing portion 33b of the same material and shape as those of the bushing portion 24b in the first embodiment. The plate portion 33a and the bushing portion 33b are integrally formed. The externally toothed washer 34 is of the same material and shape of those of the protruded portion 24a.

In this embodiment, as illustrated in FIG. 11, the bushing portion 33b of the whirl-stop member 33 is inserted into the hole 10, and further the plate portion 33a is fit into the depression 25. The end of the bushing portion 33b on the side of the contact face of the attaching portion 22 is joined with the externally toothed washer 34 by swaging. In this swaging, the bushing portion 33b and the externally toothed washer 34 may be deformed into a noncircular shape so that the externally toothed washer 34 is not rotated relative to the Whirl-stop member 33.

With this construction, the plate portion 33a and the externally toothed washer 34 are fixed together through the bushing portion 34b with the attaching portion 22 in-between. When the bushing portion 33b and the plate portion 33a are integrally formed as mentioned above, a versatile part can be used for the externally toothed washer 34.

Third Embodiment

Figure 12:
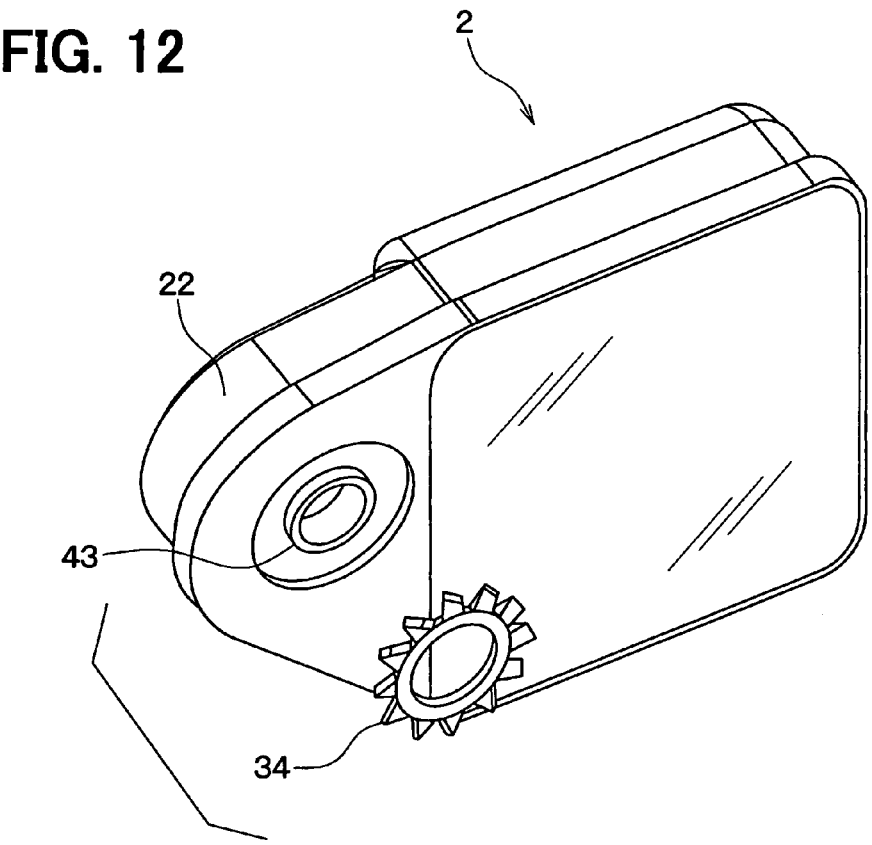
FIG. 12 is a perspective view of a radio communication module in a third embodiment.
Figure 13:
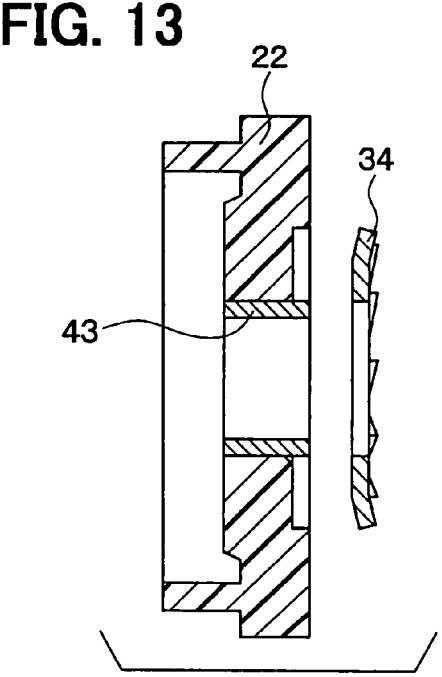
FIG. 13 is a sectional view of a radio communication module in the third embodiment, depicted in the same style as of FIG. 5.
Figure 14:
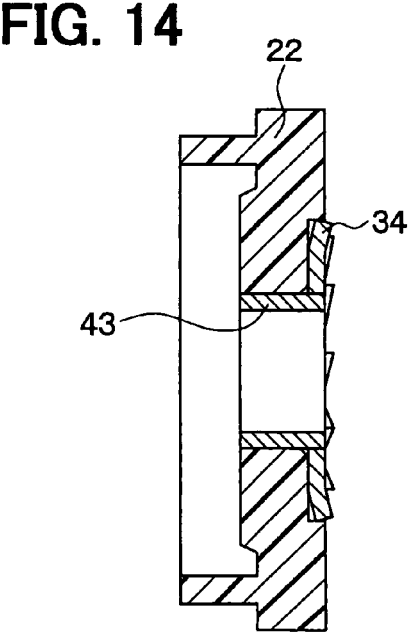
FIG. 14 is a sectional view of a radio communication module in the third embodiment, depicted in the same style as of FIG. 5.

Description will be given to a third embodiment of the invention with a focus on a difference from the second embodiment. FIG. 12 is a perspective view of a radio communication module 2 for electronic license plates in this embodiment. FIG. 13 and FIG. 14 respectively illustrate a radio communication module 2 for electronic license plates in this embodiment in the form of sectional view in the same style as of FIG. 5 and FIG. 6.

The radio communication module 2 for electronic license plates in this embodiment is different from the radio communication module 2 for electronic license plates in the second embodiment in that it has a bushing member 43 in place of the whirl-stop member 33. The bushing member 43 is of the same material and shape as those of the bushing portion 33b of the whirl-stop member 33. This bushing member 43 is formed on the inner wall of the hole 10 by insert molding, and it is thereby fixed to the attaching portion 22. The end of the bushing member 43 on the side of the contact face of the attaching portion 22 is joined with the externally toothed washer 34 by swaging. In this swaging, the bushing member 43 and the externally toothed washer 34 may be deformed so that the externally toothed washer 34 is not rotated relative to the bushing member 43.

As mentioned above, the following measure may be taken depending on the materials of the enclosure body 21 and the attaching portion 22: the bushing member 43 that receives the axial force of the bolt 3 is joined with the attaching portion 22 by insert molding, and it is joined with the externally toothed washer 34 by swaging or the like.

Fourth Embodiment

Figure 15:
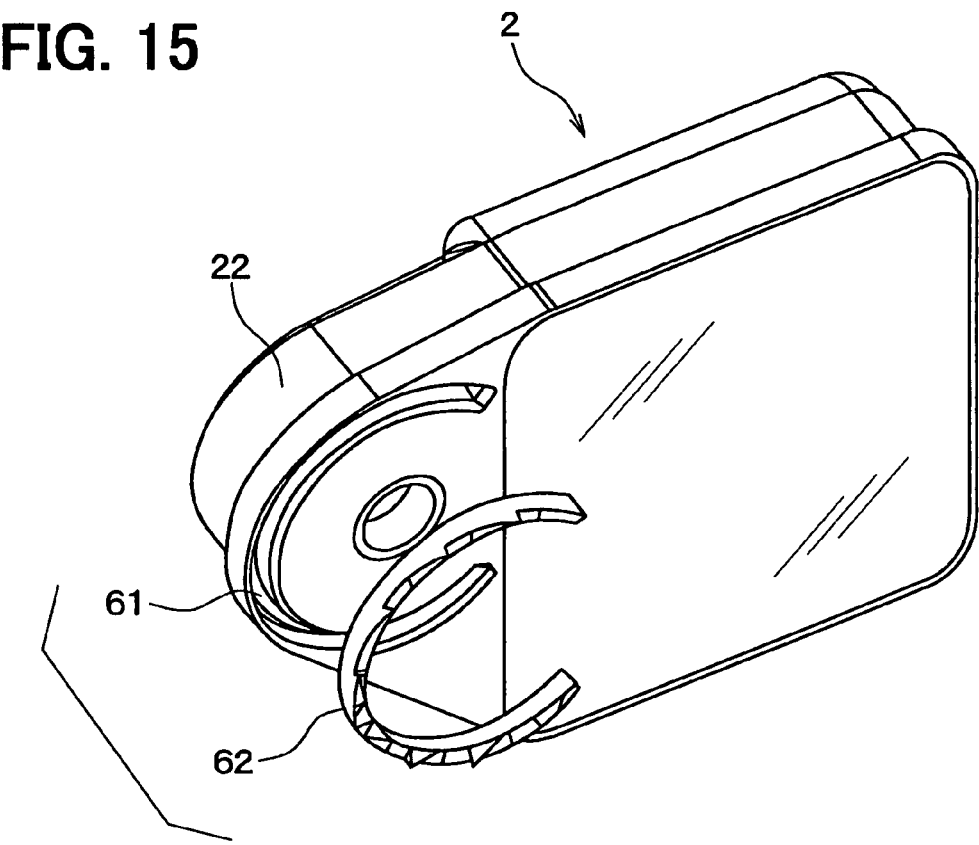
FIG. 15 is a perspective view of a radio communication module in a fourth embodiment.
Figure 16:
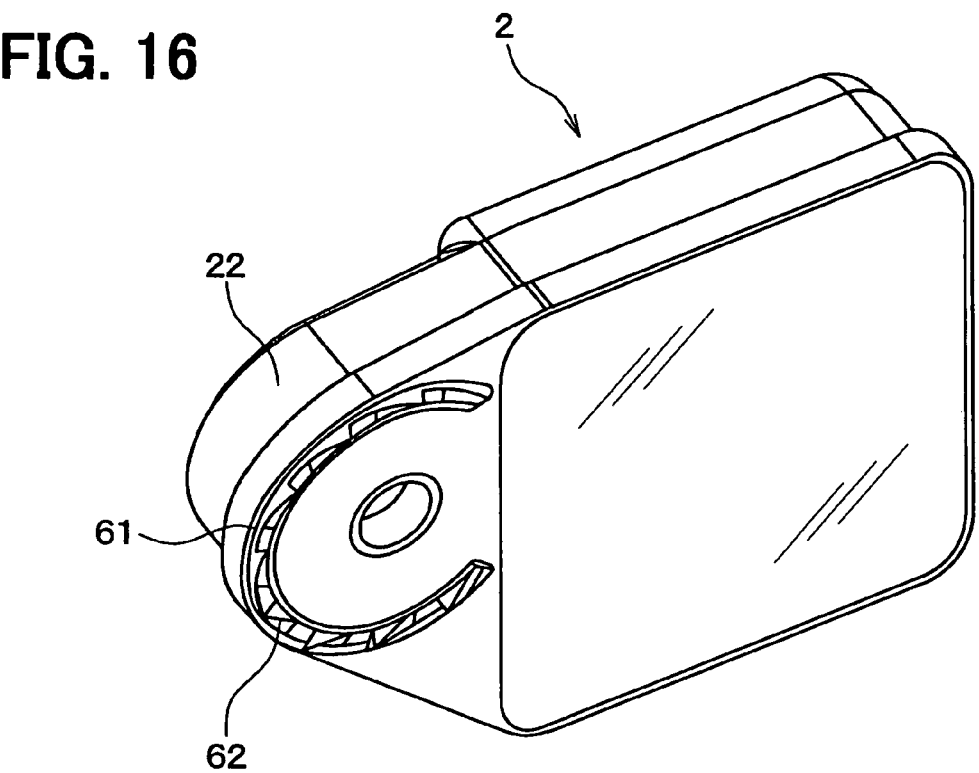
FIG. 16 is a perspective view of a radio communication module in the fourth embodiment.

Description will be given to a fourth embodiment of the invention with a focus on a difference from the first embodiment. FIG. 15 and FIG. 16 are perspective views of a radio communication module 2 for electronic license plates in this embodiment. The radio communication module 2 for electronic license plates in this embodiment is different from the first embodiment in that: the radio communication module 2 for electronic license plates in this embodiment does not have the whirl-stop plate 23 and has a toothed arch 62 in place of the protruded member 24; and the attaching portion 22 is provided on its contact face side with a groove 61 into which the toothed arch 62 is fit tight (or fit with a minute gap left). FIG. 15 illustrates the radio communication module before the toothed arch 62 is inserted into the groove 61, and FIG. 16 illustrates it after the toothed arch 62 is inserted into the groove 61.

The toothed arch 62 is a metal part (harder than the license plate 1) in the shape of arc, or partly removed circle. On the side of the toothed arch 62 attached to the license plate 1, there are provided multiple sharp-pointed protrusions arranged along the shape of the arc. When the toothed arch 62 is fit into the groove 61, it is thereby fixed on the attaching portion 22.

When the radio communication module 2 for electronic license plates assembled as illustrated in FIG. 16 is fixed on the license plate 1 with the bolt 3, the toothed arch 62 is pressed against and engaged into the license plate 1.

Since the toothed arch 62 is not circular, the toothed arch 62 itself restricts the rotation of the radio communication module 2 for electronic license plates on the bolt 3 and functions as a whirl-stop for the radio communication module 2 for electronic license plates. In this case, such a whirl-stop plate 23 as in the first embodiment can be omitted; therefore, increase in the manufacturing cost of the radio communication module 2 for electronic license plates can be suppressed.

Fifth Embodiment

Figure 17:
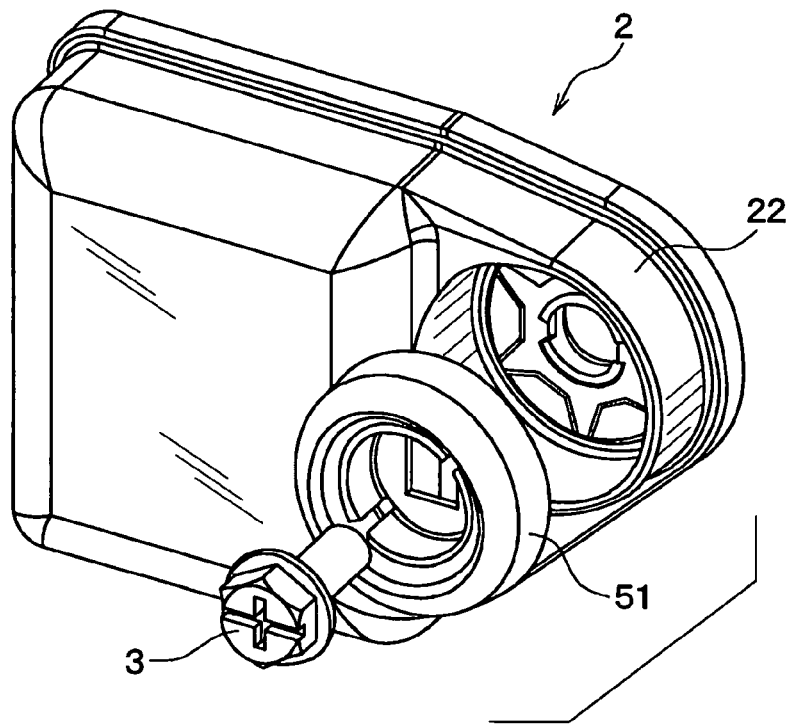
FIG. 17 is a perspective view of a radio communication module in a fifth embodiment.

Description will be given to a fifth embodiment of the invention with a focus on a difference from the first embodiment. FIG. 17 is a perspective view of a radio communication module 2 for electronic license plates in this embodiment. The radio communication module 2 for electronic license plates in this embodiment is different from the radio communication module 2 for electronic license plates in the first embodiment in that: the radio communication module 2 for electronic license plates in this embodiment has an annular sealing member 51 made of resin or metal. When the bolt 3 is inserted into the radio communication module 2 for electronic license plates, first, the bolt 3 is inserted into the hole in the sealing member 51 and then inserted into the hole 10 in the attaching portion 22. The sealing member 51 is clamped between the flange portion of the bolt 3 and the attaching portion 22, and the sealing member 51 is thereby fixed.

The following is implemented by assembling the module as mentioned above: when the radio communication module 2 for electronic license plates is installed on the license plate 1, the sealing member 51 functions as a lid that completely conceals whirl-stop mechanisms such as the whirl-stop plate 23 from the exterior. With this construction, the appearance of the license plate 1 is enhanced, and the structure for installing the radio communication module 2 for electronic license plates can be suppressed from being vandalized by someone. Further, the possibility of theft of the radio communication module 2 for electronic license plates or the license plate 1 can be reduced.

Sixth Embodiment

Figure 18:
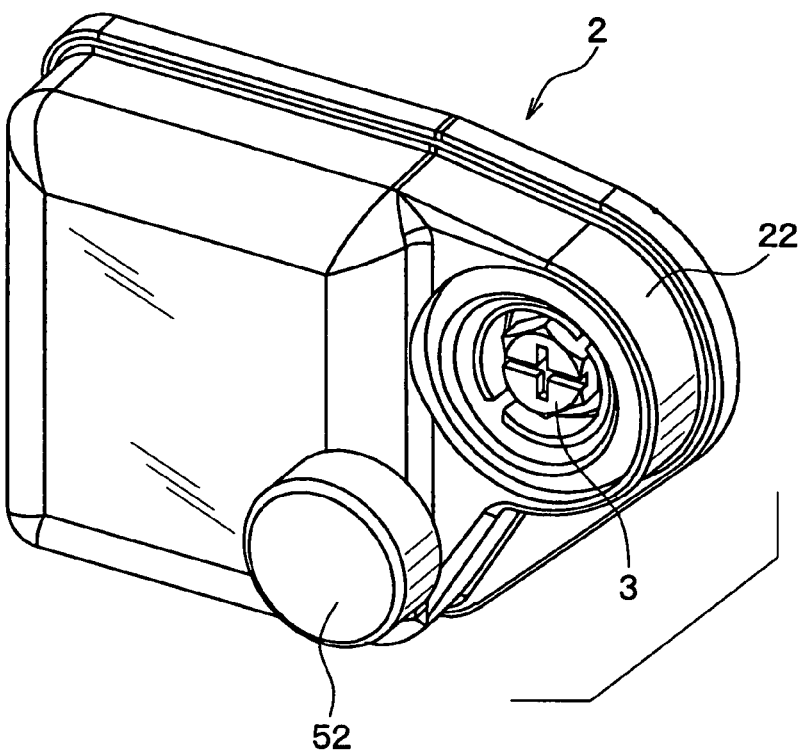
FIG. 18 is a perspective view of a radio communication module in a sixth embodiment.

Description will be given to a sixth embodiment of the invention with a focus on a difference from the fifth embodiment. FIG. 18 is a perspective view of a radio communication module 2 for electronic license plates in this embodiment. The radio communication module 2 for electronic license plates in this embodiment is different from the radio communication module 2 for electronic license plates in the first embodiment in that it has a cylindrical closed-end closing member 52 made of resin or metal in place of the sealing member 51. The bolt 3 is inserted into the radio communication module 2 for electronic license plates and the radio communication module 2 for electronic license plates is fixed on the license plate 1. Thereafter, the closing member 52 is attached to the attaching portion 22 so that the bolt 3 is covered with it.

The following is implemented by assembling the module as mentioned above: when the radio communication module 2 for electronic license plates is installed on the license plate 1, the closing member 52 functions as a lid that completely conceals whirl-stop mechanisms such as the whirl-stop plate 23 from the exterior. With this construction, the appearance of the license plate 1 is enhanced, and the structure for installing the radio communication module 2 for electronic license plates can be suppressed from being vandalized by someone. Further, the possibility of theft of the radio communication module 2 for electronic license plates or the license plate 1 can be reduced.

(Modifications)

Some examples for modifications will be taken. The size of the depression 25 may be slightly larger than the size of the whirl-stop plate 23. In this case, the whirl-stop plate 23 is not fit tight into the depression 25, but it is fit into the depression 25 with a gap left between the whirl-stop plate 23 and the depression 25. In this case, the whirl-stop plate 23 and the depression 25 are brought into point or linear contact with each other. Even in this case, the rotation of the whirl-stop plate 23 relative to the attaching portion 22 is restricted. With a gap between the whirl-stop plate 23 and the depression 25, as mentioned above, the following advantage is brought: even when the resin of the attaching portion 22 is expanded by heat, stress applied to between t he whirl-stop plate 23 and the depression 25 can be reduced or eliminated.

The material of the protrusions of the protruded portion 24a, 34, 62 lined like teeth may be resin, rubber, or the like as long as the following can be implemented: an amount of engagement, frictional force, or the like sufficient to restrict the rotation of the radio communication module 2 for electronic license plates on the bolt 3 can be ensured.

The whirl-stop member such as the whirl-stop plate 23 or the plate portion 33a may be in any shape as long as it can restrict the movement of the radio communication module 2 for electronic license plates in the direction around the bolt 3.

The protruded portion and the whirl-stop member may be joined with each other by welding, adhesive bonding, or the like. The protruded portion may be buried in the contact face of the radio communication module 2 for electronic license plates by insert molding.

The protruded portion 24a need not be attached to the attaching portion 22. Instead, it may be attached to the face of the enclosure body 21 opposed to the license plate 1.

The enclosure body 21 and the attaching portion 22 only have to be fixed together when the module is assembled to the license plate 1. They may be separated from each other at the time of, for example, manufacture, delivery, or the like.

The technology of the invention need not be applied to a radio communication module 2 for electronic license plates and is applicable to any device as long as it is installed on a license plate 1 for radio communication.

(Aspects)

Aspects of the subject matter described herein are set out in the following clauses.

As an aspect, a radio communication module to be installed on the license plate of a vehicle is provided as follows. The module has a hole formed for inserting a bolt for fixing the license plate on the vehicle body of the vehicle. The module includes an enclosure for protecting a circuit for radio communication and a protruded portion that can be fixed on the enclosure; and the position in which the protruded portion is fixed on the enclosure is such that the following takes place when the radio communication module is installed on the license plate: the protruded portion is pressed by the enclosure and thereby engaged into the license plate.

As mentioned above, when the radio communication module is installed on the license plate, the enclosure is fixed on the license plate by the bolt. Further, the protruded portion fixed on the enclosure is engaged into the license plate. As the result of the protruded portion being engaged into the license plate, as mentioned above, the following is implemented: the radio communication module can be installed on the license plate with the rotation of the radio communication module relative to the license plate suppressed. At the time of installation, it is unnecessary to use an end of the license plate. Even when the license plate is bent, the rotation of the radio communication module can be suppressed as long as the protruded portion is pressed against the license plate.

The protruded portion may be disposed and fixed on a circumference with the hole formed in the enclosure positioned in the center. With this construction, the rotation of the radio communication module on the bolt can be efficiently suppressed.

Or, the protruded portion may be so constructed that it is fit in an arch-shaped groove formed in the enclosure and is thereby fixed on the enclosure. With this construction, the enclosure and the protruded portion can be suppressed from being displaced in the direction of rotation on the bolt by the presence of the protruded portion itself.

The radio communication module may be so constructed that: it further includes a noncircular fixing member and a bushing portion to be inserted into the hole; and the enclosure has a depression around the hole on the opposite side to the side facing toward the license plate. Then, the protruded portion may be fixed in a portion forming the hole by taking the following measure: the rotation of the protruded portion and the fixing member relative to each other with the hole in-between is restricted and they are fixed through the bushing portion; at the same time, the fixing member is fit in the depression with its rotation restricted.

With this construction, the rotational displacement of the fixing member is restricted by the depression. As a result, the enclosure and the protruded portion can be suppressed from being rotated on the bolt relative to each other. Since the protruded portion is fixed on the enclosure through the bushing portion, the protruded portion can be effectively pressed against the license plate by tightening the bolt.

In this case, the protruded portion may be formed integrally with the bushing portion so that the fixing member and the protruded portion are fixed to each other through the bushing portion. With this construction, the protruded portion can be reliably engaged into the license plate when the bolt is tightened.

The fixing member may be formed integrally with the bushing portion so that the fixing member and the protruded portion are fixed to each other through the bushing portion.

The radio communication module may include a lid that conceals the hole from view from the exterior when the module is installed on a license plate. With this construction, a structure for installing the radio communication module can be concealed. Therefore, the appearance of the radio communication module is enhanced, and the structure for installation can be suppressed from being vandalized by someone.

The above-mentioned aspects may be effective in a case that a gravity center of the enclosure may be deviated from a rotation axis of the bolt to thereby cause a force for rotating the enclosure around the bolt when the enclosure is installed on a license plate using the bolt.

As another aspect, a radio communication module to be installed on the license plate of a vehicle is provided as follows. The module includes an enclosure body for protecting a circuit for radio communication, a hole forming portion with a hole for inserting a bolt formed therein, and a protruded portion; and when the enclosure body is installed on a license plate, the hole forming portion is fixed on the enclosure body and is further fixed on the license plate by the bolt passing through the hole. When the hole forming portion is fixed on the license plate by the bolt passing through the hole, the protruded portion is fixed on the enclosure body or the hole forming portion and is engaged into the license plate.

That the hole forming portion "is fixed on the enclosure when the enclosure is installed on a license plate" means that it has been fixed on the enclosure at the time of installation at the latest. That is, the hole forming portion may be fixed on the enclosure any time as long as the hole forming portion has been fixed on the enclosure when the enclosure is installed on the license plate. The hole forming portion may be fixed on the enclosure when or before the enclosure is installed on the license plate. Or, the enclosure and the hole forming portion may be integrally molded beforehand.

That the protruded portion "is fixed on the enclosure or the hole forming portion when the hole forming portion is fixed on the license plate by the bolt passing through the hole" means the following: the protruded portion has been fixed on the enclosure or the hole forming portion at the time of fixing at the latest. That is, the protruded portion may be fixed on the enclosure or the hole forming portion any time as long as the protruded portion has been fixed on either of them when the hole forming portion is fixed. The protruded portion may be fixed when or before the hole forming portion is fixed on the license plate. The protruded portion may be formed beforehand on the surface of the enclosure or the hole forming portion opposed to the license plate by insert processing or the like.

Further, as yet another aspect, a method for installing a radio communication module is provided as follows. The module includes an enclosure for protecting a circuit for radio communication and having a hole for inserting a bolt, and a protruded portion on the license plate of a vehicle. The method comprises: pressing the protruded portion against the license plate with the protruded portion fixed on the enclosure; and inserting the bolt into the hole and the license plate.

It will be obvious to those skilled in the art that various changes may be made in the above-described embodiments of the present invention. However, the scope of the present invention should be determined by the following claims.

What is claimed is:

1. A radio communication module to be installed on a license plate of a vehicle, the module comprising:
   an enclosure configured to protect a circuit for radio communication and have a hole for inserting a bolt for fixing the license plate on a vehicle body of the vehicle via a contact face side of the enclosure, the contact face side being opposed to the license plate; and
   a protruded member comprising a protruded portion having points of protrusions, the protruded member being configured to be fixed on the contact face side of the enclosure such that the points of the protrusions of the protruded portion are pressed by the enclosure and thereby engaged into the license plate when the radio communication module is installed on the license plate.

2. The radio communication module of claim 1, wherein the protruded portion is disposed and fixed on a circumference, in which the hole formed in the enclosure is approximately centered.

3. The radio communication module of claim 2, wherein the protruded portion is constructed to be fit in an arch-shaped groove formed in the enclosure and thereby fixed on the enclosure.

4. The radio communication module of claim 1, further comprising:
   a noncircular fixing member; and
   a bushing portion to be inserted into the hole, wherein
   the enclosure has a depression around the hole on an opposite side to a side facing toward the license plate,
   the protruded portion is to be fixed in a portion forming the hole
   by restricting a rotation of the protruded portion and the fixing member relative to each other with the hole in-between and fixing the protruded portion and the fixing member through the bushing portion and simultaneously by fitting the fixing member in the depression with a rotation of the fixing member restricted.

5. The radio communication module of claim 4, wherein the protruded portion is formed integrally with the bushing portion so that the fixing member and the protruded portion are fixed to each other through the bushing portion.

6. The radio communication module of claim 4, wherein the fixing member is formed integrally with the bushing portion so that the fixing member and the protruded portion are fixed to each other through the bushing portion.

7. The radio communication module of claim 1, further comprising:
   a lid configured to conceal the hole from view from an exterior when the module is installed on the license plate.

8. The radio communication module of claim 1, wherein when the enclosure is installed on a license plate using the bolt, a gravity center of the enclosure is deviated from a rotation axis of the bolt to thereby cause a force for the enclosure to rotate about the bolt.

9. A radio communication module to be installed on a license plate of a vehicle, the module comprising:
   an enclosure body for protecting a circuit for radio communication;

a hole forming portion having a hole for inserting a bolt formed therein; and a protruded member comprising a protruded portion having points of protrusions, wherein when the enclosure body is installed on the license plate, the hole forming portion is fixed on the enclosure body and is further fixed on the license plate via a contact face side of the enclosure body by the bolt passing through the hole, and when the hole forming portion is fixed on the license plate by the bolt passing through the hole, the protruded portion is fixed on the contact face side of the enclosure body or the hole forming portion and the points of the protrusions of the protruded portion are engaged into the license plate.

10. The radio communication module of claim 9, wherein when the enclosure body is installed on a license plate using the bolt, a gravity center of the enclosure body is deviated from a rotation axis of the bolt to thereby cause a force for the enclosure body to rotate about the bolt.

11. A method for installing a radio communication module on a license plate of a vehicle, the module including (i) an enclosure for protecting a circuit for radio communication and having a hole for inserting a bolt, and (ii) a protruded portion having points of protrusion, the method comprising:

pressing the protruded portion against the license plate in a manner that the points of protrusion of the protruded portion are fixed on a contact face side of the enclosure to thereby face the license plate; and inserting the bolt into the hole and the license plate.

12. The method of claim 11, wherein when the enclosure is installed on a license plate using the bolt, a gravity center of the enclosure is deviated from a rotation axis of the bolt to thereby cause a force for the enclosure to rotate about the bolt.

13. The radio communication module of claim 1, wherein when the radio communication module is installed on the license plate, the enclosure is fixed to the license plate by inserting a single bolt through the hole.

* * * * *